United States Patent [19]

Wright

[11] Patent Number: 5,071,361

[45] Date of Patent: Dec. 10, 1991

[54] DRAPERY GUARD

[76] Inventor: Howard C. Wright, 6139 East Rosewood, Tucson, Ariz. 85711

[21] Appl. No.: 709,371

[22] Filed: Jun. 3, 1991

[51] Int. Cl.⁵ ............................................. H01R 13/44
[52] U.S. Cl. ...................................... 439/135; 174/66; 220/241; 439/373; 439/538
[58] Field of Search .................. 174/66; 439/135, 136, 439/373, 538, 539, 577, 929; 220/241

[56] References Cited

U.S. PATENT DOCUMENTS

| | | | |
|---|---|---|---|
| 2,510,745 | 6/1950 | Kilgore | 439/373 |
| 2,722,665 | 11/1955 | Sauder | 439/135 |
| 3,013,105 | 12/1961 | Craig | 439/135 |
| 3,200,989 | 8/1965 | Hubbell | 220/24.3 |
| 3,491,327 | 1/1970 | Tait et al. | 339/36 |
| 4,059,327 | 11/1977 | Vann | 339/122 R |
| 4,083,618 | 4/1978 | Busch, Jr. | 339/36 |
| 4,335,863 | 6/1982 | Rapps | 174/66 |
| 4,339,045 | 7/1982 | Bodin | 174/66 |
| 4,424,407 | 1/1984 | Barbic | 339/75 P |
| 4,603,932 | 8/1986 | Heverly | 339/39 |
| 4,643,502 | 2/1987 | Arnold | 339/36 |
| 4,702,709 | 10/1987 | Santilli | 439/144 |

Primary Examiner—Paula A. Bradley
Attorney, Agent, or Firm—J. Michael McClanahan

[57] ABSTRACT

A one piece drapery guard for attachment to an electrical wall outlet which serves to hold hanging drapes away from the outlet as a safety fire preventive measure is disclosed. The drapery guard has two major elements, the first being a holding flange adapted to be operably attached to the electrical wall outlet and the second a drapery shield extending outward of the electrical wall outlet to engage the drapes. The holding flange is secured under the electrical outlet face plate and has an evacuated "T" slot formed therein to receive mounting hardware of the electrical wall outlet to help secure the guard when pressure is brought upon it by the fastening down of the face plate. The shield portion includes an opening adapted to accommodate the electrical cords of electrical plugs utilizing the electrical wall outlet as the cords drop to the floor.

14 Claims, 1 Drawing Sheet

DRAPERY GUARD

BACKGROUND OF THE INVENTION

1. Field of the Invention

The field of the invention is safety covers and other devices placed proximate electrical wall outlets to prevent combustible materials, such as drapes, from coming in contact with potentially overheated electrical plugs or malfunctioning electrical wall sockets within the electrical wall outlets.

2. Prior Art

Electrical fires constitutes one of the major sources of home fires. A portion of these electrical fires start from overheated electrical apparatus, such as an electrical plug mating with the electrical socket within an electrical wall outlet, or, perhaps, a malfunctioning electrical female wall socket within an outlet has shorted and overheats. As the electrical plug or electrical wall outlet overheats, nearby combustible materials which may be in contact with the plug or outlet have their temperature raised until the flash point is reached at which time the material catches fire. One good source of combustible materials, which in many cases are situated proximate an electrical wall outlet and mated electrical plugs associated with that wall outlet, are window coverings or drapes. Many times, an electrical wall outlet may purposely be placed beneath the window or closely beside a window or other area which is covered with drapes for aesthetic reasons, however, in doing so potential fire hazards may be created.

Now there have been inventions in the past whose purpose is to enclose an electrical wall outlet for potential fire hazards and child safety reasons, although child safety appears to be the predominant basis.

For example, Tait in U.S. Pat. No. 3,491,327 discloses a safety cover for an electrical plug outlet wherein a plastic or metal cover is so shaped as to engage the undersides of the peripheral edges of the electrical outlet face plate for the purpose of making relatively protected electrical plugs mating with the electrical wall outlet. The safety cover, which takes the form of a box with one end open, is slid down over the face plate to encapsulate the electrical plugs. The electrical cords attached to the electrical plugs then exit the bottom of the safety cover through the opening.

Arnold in U.S. Pat. No. 4,643,502, provides another box-like safety device sliding down over the electrical wall outlet to encapsulate the outlet and any electrical plugs mating in the outlet.

Busch details another box-like safety enclosure in U.S. Pat. No. 4,083,618 adapted to be permanently attached to the electrical wall outlet which has two hinged sections which allow entrance to each of the electrical wall outlets separately and which has means in its outside portions to separately exit each electrical cord.

Similar box-like safety outlet covers are shown in U.S. Patents to Barbic, U.S. Pat. No. 4,424,407 and Heverly, U.S. Pat. No. 4,603,932.

In addition, it is known to place box-like enclosures over electrical wall outlets for weather protection, especially those used out-of-doors, much like the cover attachment shown in the U.S. Patent to Hubbell, U.S. Pat. No. 3,200,989.

As mentioned earlier, primarily the prior art known to the Applicant appears to be art related to rendering the electrical wall outlet inaccessible to children by covering the electrical wall outlet with the box-like cover, making provision in the construction of the cover to accommodate electrical plugs and their associated wires. However, such devices, while they would protect against an overheating plug if the box-like structure were sufficiently large so as to have its sides far from the overheating plug or outlet, yet they are relatively complicated in construction and therefore necessarily relatively expensive, especially when compared with Applicant's safety device.

Accordingly, it is apparent that there is need for a device to protect drapes and other combustible materials which may normally hang down proximate an electrical wall outlet from potentially catching fire in the event of an overheated electrical wall outlet or mating plug. Such a device, easily constructed and installed, is provided by the instant invention.

SUMMARY OF THE INVENTION

The embodiment of the invention described consists of a drapery guard adapted to be secured to an electrical wall outlet for the purposes of protecting hanging drapes which normally cover the outlet from potential fire hazards caused by an overheated electrical plug mating with the outlet, or the outlet itself overheating from an internal short. To accomplish this, the inventor proposes in his drapery guard to provide a device which holds the draperies at a safe distance away from the electrical wall outlet while at the same time providing for handling the electrical cords normally attached to electrical plugs mating with the electrical wall outlet.

More particularly, the subject drapery guard consists of a thin sheet of preferably plastic sheet material generally in the shape of a half-circle with an attached flange wherein means are provided along the flat side flange portion to secure the device to the electrical wall outlet. The semicircle portion of the drapery guard then protrudes outwardly from the electrical wall outlet, and the wall in which the outlet resides, to engage the hanging drapes whereby the drapes are held away at a safe distance.

Comprising the drapery guard is the first section or portion which is adapted to be secured to the electrical wall outlet, namely the holding flange, the holding flange placed under the face plate of the electrical wall outlet and be secured thereto by the holding pressure of the face plate attached to the electrical wall outlet. Next, protruding outward from the holding flange is the drapery shield, that half-circle portion adapted to engage the drapes. In the preferred embodiment, the angle at which the drapery shield portion joins with the holding flange is nominally 110 degrees, 20 degrees off a right angle. Also in the preferred embodiment, the shield of the subject drapery guard bends outward and down 20 degrees off a perpendicularly outward configuration. Centrally through the drapery shield portion of the invention is a rather large opening through which pass the electrical cords of electrical plugs mating with the socket. In this orientation, the electrical cords then drop to the floor to run to the electrical appliances, such as electrical lights or the like.

As indicated, the subject invention is preferably constructed from thin relatively high temperature plastic or other type sheet material which is resilient and in its preferred embodiment comprises one piece. The fold line separating the holding flange from the drapery shield is parallel to the back edge and is so located that the bend comprising the fold line may be made at a point just as the holding flange emerges from underneath the electrical outlet face plate.

In the preferred embodiment, an inverted "T" slot cavity is formed in the holding flange to accommodate brackets and screws normally attached to parts or hardware of the electrical wall outlet and the electrical female socket contained therein, parts which are normally covered over with the face plate. An additional benefit of the construction of the invention provides that with the cavity of the "T" slot being occupied by various brackets and screws of the electrical wall outlet hardware, additional resistance against the invention against pull out, side-to-side movement, or rotation is achieved. Various slot configurations are suggested for various types of electrical wall outlet hardware configuration.

In construction of the device, once the device has been formed from sheet material, such as plastic or metal, by stamping or cutting, the bend between the holding flange portion and the drapery shield portion is accomplished.

Accordingly, it is an object of the subject invention to provide a drapery guard adapted to attach to an electrical wall outlet to protect draperies from overheated electrical plugs mated with electrical wall outlets or an overheated outlet itself.

It is another object of the subject invention to provide a drapery guard which may be easily constructed and attached to an electrical wall outlet which holds hanging draperies normally covering the outlet away from the outlet.

It is still another object of the subject invention to provide a drapery guard which attaches to an electrical wall outlet and which also accommodates electrical plugs mating with the outlet and the plug's associated electrical wiring.

Other objects of the invention will in part be obvious and will in part appear hereinafter. The invention accordingly comprises the apparatus possessing the construction, combination of elements, and arrangement of parts which are exemplified in the following detailed disclosure and the scope of the application which will be indicated in the claims.

BRIEF DESCRIPTION OF THE DRAWINGS

For further understanding of the features and objects of the subject invention, reference should be had to the following detailed description taken in connection with the accompanying drawings wherein.

In various views, like index numbers refer to like elements.

DETAILED DESCRIPTION OF THE PREFERRED EMBODIMENT

Figure 1:
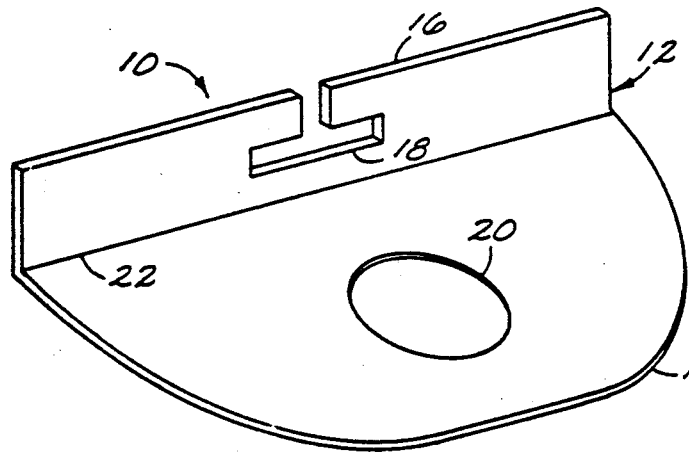
FIG. 1 is a perspective view of the subject invention.

Referring now to FIG. 1, a perspective view of drapery guard 10 is shown. In the preferred embodiment, drapery guard 10 is one piece, comprising two main sections, namely holding flange 12 and drapery shield 14. Holding flange 12, an elongated rectangularly shaped flattened panel, is adapted to reside under the face plate of a female type electrical wall outlet and be secured there. Attached to holding flange 12 is drapery shield 14 which extends outward from the electrical wall outlet and wall so that draperies which normally hang down and cover the outlet are held away from the outlet and any electrical plugs which may be mated there. Situated within drapery shield 14 is a rather large opening 20 which allows the passage therethrough of electrical cords attached to male type electrical plugs utilizing the electrical wall outlet. The electrical wires connected to these plugs drop to the floor immediately below the electrical wall outlet, and accordingly the drapery shield also serves the purpose to keep these electrical wires away from the drapes.

In the preferred embodiment, the angle between holding flange 12 and drapery shield 14 is an obtuse angle, nominally 110 degrees, i.e., nominally 20 degrees off perpendicular. It has been determined that this appears to be a suitable angle to hold the drapery shield away from the wall which secures the electrical wall outlet, the draperies tending to slide on it rather easily and not get hung up.

Located centrally in holding flange 12 is inverted "T" slot 18 cavity in which material is removed or evacuated, "T" slot 18 adapted to reside completely under the face plate of the electrical wall outlet. The evacuated portions of "T" slot 18 accommodate screws, brackets, and other hardware of the electrical wall outlet and contained electrical female socket which generally protrude outward and are covered by the face plate, the face plate of which is usually slightly concave on its underside. This allows the face plate to more securely hold drapery guard 10. In the embodiment shown, the shank of inverted "T" slot 18 intersects holding flange 12 at its midpoint along top edge 16 with the top cross or arm portion of the inverted "T" closest to the joinder with drapery shield 14 portion.

In the preferred embodiment, drapery guard 10 is rectangularly shaped of two rounded corners, constructed of thin resilient plastic sheet which is permanently angled at fold line 22 between holding flange 12 and drapery shield 14. It has been determined by the inventor that in the preferred embodiment, useful dimensions of drapery shield 10 are about 12 inches long with the holding flange 1 inch wide, and the drapery shield about 4 inches at its maximum width. Opening 20 is preferably centrally located with respect to the shield length and is about 1¾ inches in diameter and resides with its closest edge 1 inch from the outside edge of drapery shield 14.

Figure 2:
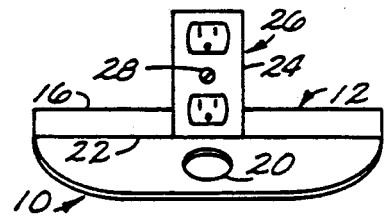
FIG. 2 is a front view of the invention in place operably attached to an electrical wall outlet.

FIG. 2 is a front view of inventive drapery guard 10 held in place by face plate 24 of electrical wall outlet 26. Not seen in FIG. 2 is "T" slot 18 which resides immediately underneath face plate 24. Holding face plate 24 to electrical wall outlet 26 is centrally located holding screw 28, holding screw 28 compressing the underside of face plate 24 against holding plate 12 which in turn is compressing against the electrical wall outlet 26 immediately underneath and in most cases, also against the wall within which the electrical wall outlet resides. As will be shown in FIG. 4, by the design of "T" slot 18, security against possible rotation or sideways movement of drapery guard 10 is enhanced.

Figure 3:
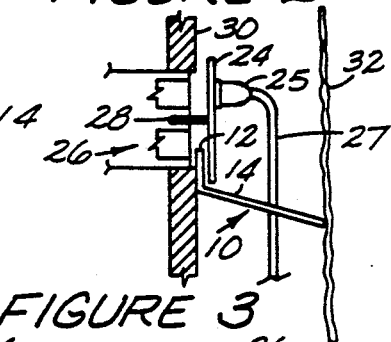
FIG. 3 is a partial sectional view of the subject invention in place attached to an electrical wall outlet.

FIG. 3 is a cross sectional view taken through a typical wall 30 of a building having electrical wall outlet 26 installed therein where, as seen in FIG. 3, face plate 24 is held to electrical wall outlet 26 and wall 30 by means of holding screw 28. Holding flange 12 of drapery guard 10 is secured under the lower underside portion of face plate 24 against both electrical wall outlet 26 and wall 30. Seen also in FIG. 3 is drapery shield 14 angled out from holding flange 12 at the 110 degree angle (20 degrees off perpendicular) such to hold draperies 32 away from electrical wall outlet 26. With the electrical cords 27 of male type electrical plugs 25 secured in the female sockets of the electrical wall outlet dropping through the opening 20 (not shown) of drapery shield 14 to the floor, both the electrical wall outlet 26 and electrical plugs and their cords are situated away from the potentially flammable drapes 32. As indicated earlier, drapery shield 14, in its preferred embodiment has a width of approximately 4 inches and so the drapes are held away from electrical outlet by nearly the full 4 inches, sufficient distance to render the drapes safe from possible fire due to an overheating plug or electrical wall socket. In addition, the preferred embodiment of the invention is constructed from high temperature plastic.

As seen in FIGS. 2 and 3, in the preferred embodiment, the bottom edge of face plate 24 extends to or nearly to fold line 22 of drapery guard 10.

Figure 4:
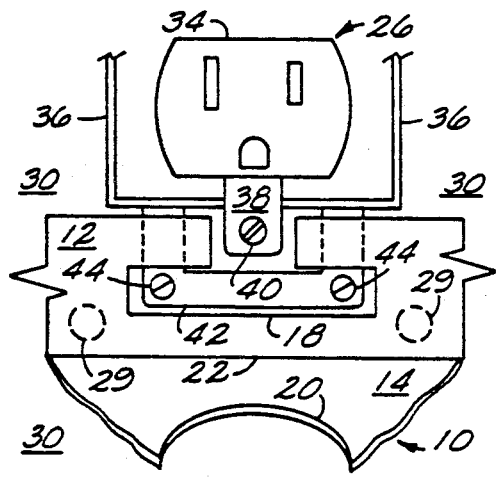
FIG. 4 is a partial front view of the subject invention attached to an electrical wall outlet with the face plate removed.

Turning now to FIG. 4, a front partial view of electrical wall outlet 26 with its face plate removed is detailed showing the relationship of "T" slot 18 to the various hardware components of electrical wall outlet 26. Shown in FIG. 4 is one of the usual two electrical outlet female sockets surrounded by metal or plastic box 36. Box 36 is attached to a stud (not shown) supporting the wall, or to the wall board or other material comprising wall 30 (as shown), and that female electrical socket 34 secures to and is removable from box 36. Electrical socket 34 has a protruding bracket 38 which receives screw 40 passing through an opening in bracket 38, screw 40 attaching to box 36 by means of a female threaded opening immediately below which also is attached to box 36. In the illustration shown in FIG. 4, box 36 is held to wall 30 by means of "U" shaped bracket 42, bracket 42 having two screws 44 which penetrate the wall.

The design of "T" slot 18 formed in holding flange 12 shown in FIG. 4 is dictated by the hardware of electrical wall outlet 26 and the contained female electrical socket 34. The top portion of the "T" slot 18 shown permits its evacuated top arm portion to be occupied by the two screws 44 as well as by a part of bracket 42. "T" slot 18 receives in its shank portion cavity protruding bracket 38 with its holding screw 40. Also shown are optional friction pads 29 which may be made of rubber or silicon and are adhered at appropriate places to holding flange 12 to be engaged by the face plate (24 in FIGS. 2, 3) to help frictionally secure the two.

Thus, when the face plate is placed over electrical wall outlet 26 with drapery guard 10 set in place as shown in FIG. 4 and then screw 28 (FIGS. 2 and 3) tightened down, drapery guard 10 is securely held in position against movement, either to the right or left, or bottom or top. Additionally, by construction of the shank portion of "T" slot 18 as shown (in combination with the top arm portion), resistance to rotational movement is also achieved.

Figure 5:
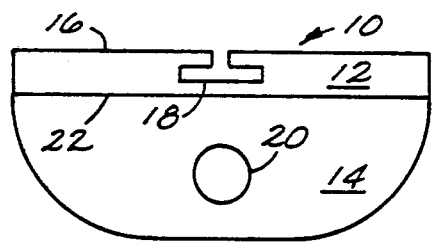
FIG. 5 is a top view of the subject invention in a flat plane prior to bending.

Referring now to FIG. 5, drapery guard 10 is shown in a substantially reduced in size (from FIG. 4) top view after being cut out or stamped from flat plastic sheet (or metal), and prior to bending along fold line 22. From the left, top edge 16 is seen along the far side, its edge interrupted by the opening forming the shank of "T" slot 18, "T" slot 18 being fully formed within holding flange 12. Connected to holding flange 12 at fold line 22 is drapery shield 14, drapery shield 14 penetrated by opening 22 which accommodates the electrical cords of electrical plugs. In the preferred embodiment, the shape of drapery shield 14 is much like that shown in FIG. 5, being substantially rectangular in shape but having two greatly rounded corners connecting two opposite and parallel flat sides or ends. Commenting further upon the dimensions of the invention given above in connection with FIG. 1, typical size of "T" slot 18 is that the shank is ¾ inch long and ¼ inch wide, and top arm 1¼ inches long and 5/16 inch wide.

Figure 6:
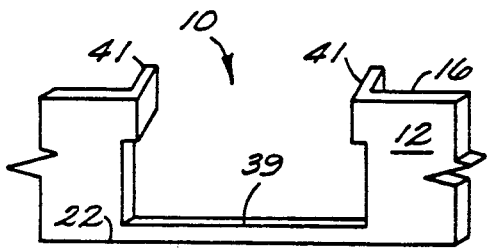
FIG. 6 is a partial front perspective view of the holding flange of the invention showing an alternate embodiment.

Now it is anticipated that the invention be adaptable to multiple electrical wall outlets, still utilizing of course the outlet face plate to secure the drapery guard, therefore various types of "T" slots or other shaped slots may be formed in holding flange 12 so that the hardware portions of the electrical wall outlet (and contained female electrical socket) which normally reside slightly out of the box walls of the outlet may be accommodated. FIG. 6 is a partial front perspective view of holding flange 12 of the invention showing a modified slot 39. In this embodiment, a greatly enlarged slot 39 is still adapted to receive within its evacuated portion one or both of the securing bracket and other hardware of the electrical wall outlet, such as securing bracket 42 or protruding bracket 38 shown in FIG. 4. Further, adjacent slot 39 are tangs 41 which are bent downward at a right angle. These down extending tangs drop into the cavity of the box portion of the electrical wall outlet 26 near or at opposite sides.

For example, if the electrical wall outlet were of the type which is attached to the wall stud, bracket 42 (FIG. 4) would not be present. All that may be present would be protruding bracket 38. In that case, drapery guard 10 shown in FIG. 6 will function very well with downwardly protruding tangs 41 extending into box 36 of electrical wall outlet 26 shown in FIG. 4. Slot 39 shown in FIG. 6 can be so adapted that its length is nearly the width of the electrical box so that downwardly protruding tangs 41 engage opposite corners and sides of electrical box 36. With that arrangement, and with the electrical outlet face plate in place, drapery guard 10 is securely held from lateral movement, up and down movement, or pivotal movement.

Figure 7:
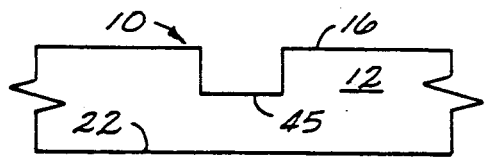
FIG. 7 is a partial front view of the holding flange of the invention in another alternate embodiment.

A still another alternate embodiment of the subject invention is shown in FIG. 7 wherein the "T" slot 18 of the preferred embodiment has been replaced with a rectangularly formed slot 45. Here, drapery guard 10 would ride over securing bracket 42 as shown in FIG. 4 (or bracket 42 may not be present) with protruding bracket 38 received within slot 45. Since in many cases, protruding bracket 38 stands out a greater distance from electrical wall outlet 26 than does the outlet securing bracket 42 (if present), accommodation for the greatest protrusion has been provided for, and with the face plate pressing down upon drapery guard 10, it is secured in place. Here, however, drapery guard 10 would not be as secured against forceful downward movement, being secured against that direction of movement only by the frictional forces of the face plate upon the drapery guard. Also, depending upon the fitting relationship of protruding tang 38 within slot 45, limited rotation may be possible, realizing of course that drapery guard 10 shown in FIG. 7 always has in its favor frictional pressure resisting rotation. Friction pads 29 shown in FIG. 4 may also be utilized here with favorable results.

While it is realized that there may well be other types of electrical outlets which incorporate various means to secure it to the wall and various methods securing the electrical sockets within the electrical wall outlet, all which have hardware protruding outward of the electrical wall socket and wall, the slot formed in holding flange 12 may be accordingly constructed for full accommodation of these protrusions within its cavity. Therefore, it is well within the state of the art to form such an accommodating slot in holding flange 12.

Figure 8:
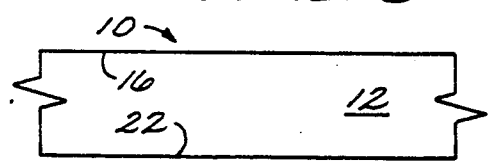
FIG. 8 is a partial front view of the holding flange of the invention in still another alternate embodiment.

Further, it is entirely possible for the invention to be constructed such that no slot be placed in holding flange 12, that the drapery guard be held entirely by frictional pressure of the holding flange between the face plate, the wall, and the protruding hardware of the electrical wall outlet and female electrical socket. Such an embodiment is shown in FIG. 8 wherein is seen in a front partial view of the central portion of holding flange 12 without a slot.

Figure 9:
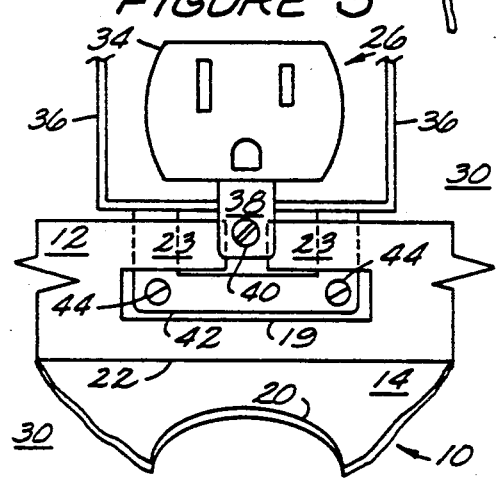
FIG. 9 is a partial front view of an alternate embodiment of the subject invention attached to an electrical wall outlet with the face plate removed.

A still further embodiment of the subject invention is shown in FIG. 9 wherein the tangs 23 situated on opposite sides of the shank of "T" slot 19 have been lengthened in order that they should extend under the outstretched bracket 38 attached to the female electrical socket 34. Of course, in installing the subject invention, screw 40 will need be loosened sufficiently that bracket 38 will ride up and allow each of the tangs 23 of holding flange 12 to be slipped under the bracket. At that time, bracket 42 will also fit into the top leg portion of "T" slot 19 and then screw 40 may be tightened.

While a preferred embodiment of the invention has been shown and described, together with alternate embodiments, it is appreciated that still other embodiments of the invention are possible and that there is no intent to limit the invention by such disclosure, but rather, it is intended to cover all modifications and alternate embodiments falling within the spirit and scope of the invention as defined in the appended claims.

I claim:

1. In a configuration where combustible hanging drapes normally cover an electrical wall outlet embedded in a wall, a drapery guard adapted to hold the drapes away from the outlet as a fire safety measure, said drapery guard comprising:
 a holding flange operably secured to the electrical wall outlet; and
 a drapery shield attached to said holding flange, said drapery shield shielding the hanging drapes from the electrical wall outlet by holding the drapes spaced apart from the electrical wall outlet whereby fire prevention measures are obtained by holding the drapes away from the electrical wall outlet embedded in the wall.

2. The drapery guard as defined in claim 1 wherein said holding flange includes means assisting in securing it to the electrical wall outlet.

3. The drapery guard as defined in claim 2 wherein said holding flange securing means comprises a slot formed in said holding flange, said slot adapted to be engaged by the electrical wall outlet to assist securing said holding flange to the electrical wall outlet.

4. The drapery guard as defined in claim 3 wherein the electrical wall outlet defines an open box with four side walls including a female electrical socket interiorly to the box, and hardware attaching the electrical socket to the box and the box to the wall, said holding flange slot adapted to encompass the hardware of the electrical wall outlet thereby assisting in securing said holding flange to the electrical wall outlet.

5. The drapery guard as defined in claim 4 wherein the electrical wall outlet further includes a face plate attaching to the box, the face plate joining with the female electrical socket to cover the box, said holding flange adapted to reside between the electrical wall outlet box and the face plate with the electrical wall outlet hardware situated within said holding flange slot.

6. The drapery guard as defined in claim 5 further including a pair of friction pads attached to said holding flange, said friction pads adapted to be engaged by the electrical wall outlet face plate whereby said friction pads assist in securing said holding flange to the electrical wall outlet when the holding flange resides between the electrical wall outlet box and the face plate.

7. The drapery guard as defined in claim 5 wherein said slot of said holding flange defines a "T" slot formed in said holding flange, said "T" slot having a shank and a top arm, said shank and said top arm adapted to encompass the electrical wall outlet hardware to assist in securing said holding flange to the electrical wall outlet.

8. The drapery guard as defined in claim 7 wherein the electrical wall outlet hardware includes a protruding bracket attached to the female electrical socket adapted to be attached to the box by a securing screw, said holding flange "T" slot shank adapted to receive the securing screw with the protruding bracket engaging said holding flange on either side of said "T" slot whereby said holding flange is more securely held to the electrical outlet box when the securing screw is tightened to compress said holding flange between the protruding bracket of the female electrical socket and the electrical wall outlet case.

9. The drapery shield as defined in claim 7 wherein said holding flange has an exterior edge and said shank of said "T" slot formed in said holding flange joins said edge, further including a pair of tangs situated on opposite sides of said "T" slot shank, each of said tangs defined by said "T" slot and said edge, each of said tangs bent at an angle of 90 degrees to said holding flange to protrude outward, said tangs adapted to engage the electrical wall outlet box walls when said holding flange is secured between the electrical wall outlet box and face plate.

10. The drapery guard as defined in claim 2 wherein said holding flange defines an elongated, thin, flat panel.

11. The drapery guard as defined in claim 10 wherein said drapery shield comprises an elongated rectangularly shaped panel having two rounded corners.

12. The drapery guard as defined in claim 11 wherein said drapery shield is angled from said holding flange at their attachment.

13. The drapery guard as defined in claim 12 wherein said drapery shield is angled to said holding flange at a 110 degree angle.

14. The drapery guard as defined in claim 13 wherein said drapery shield includes an opening therethrough, said opening adapted to receive electrical cords associated with electrical plugs utilizing the electrical wall outlet.

* * * * *